Jan. 27, 1931.  K. KARNATH  1,790,009
STOP VALVE
Filed Oct. 18, 1928   2 Sheets-Sheet 1
Fig.1
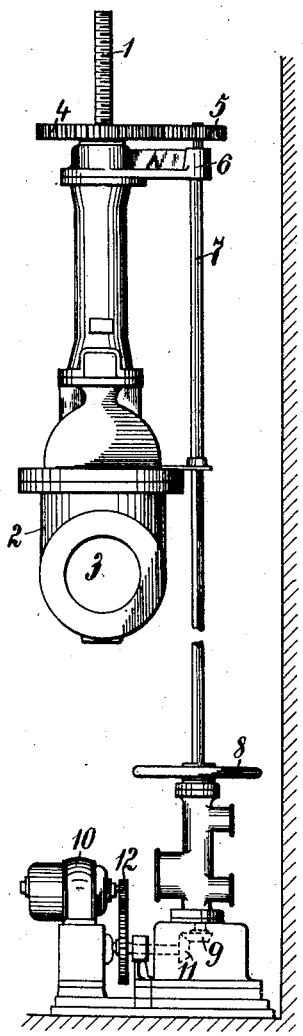
Fig.2
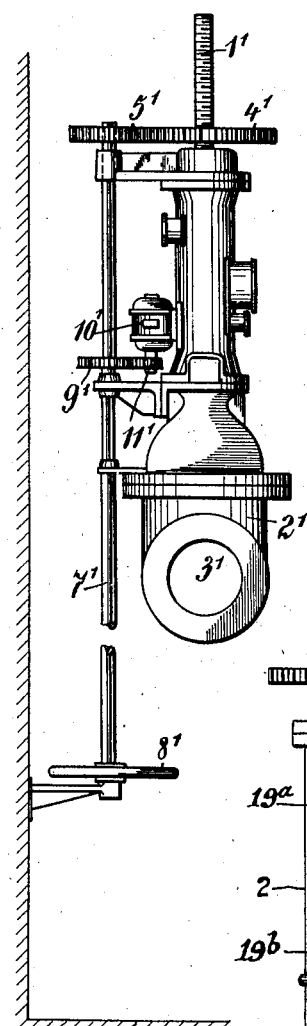
Fig.3
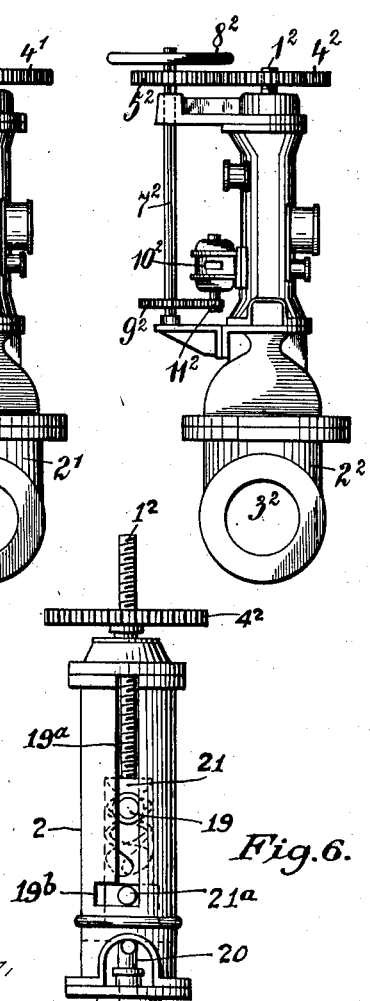
Fig.6.
Inventor:
Kurt Karnath
by
Loeka, Kellenbeck & Farley
Attorneys Jan. 27, 1931.  K. KARNATH  1,790,009
STOP VALVE
Filed Oct. 18, 1928   2 Sheets-Sheet 2
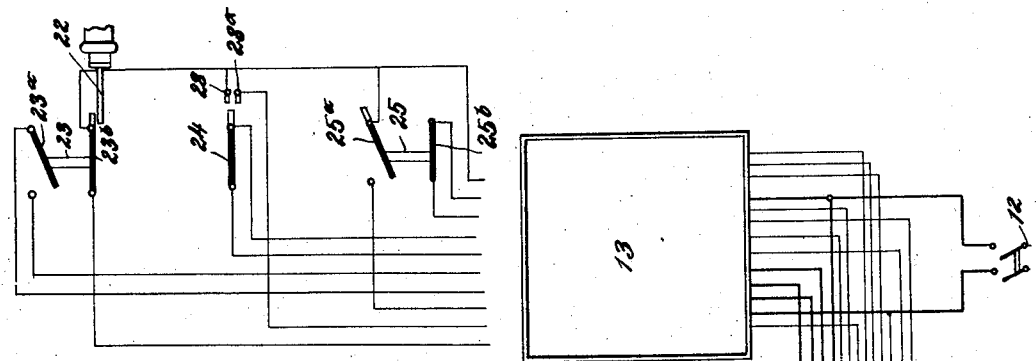
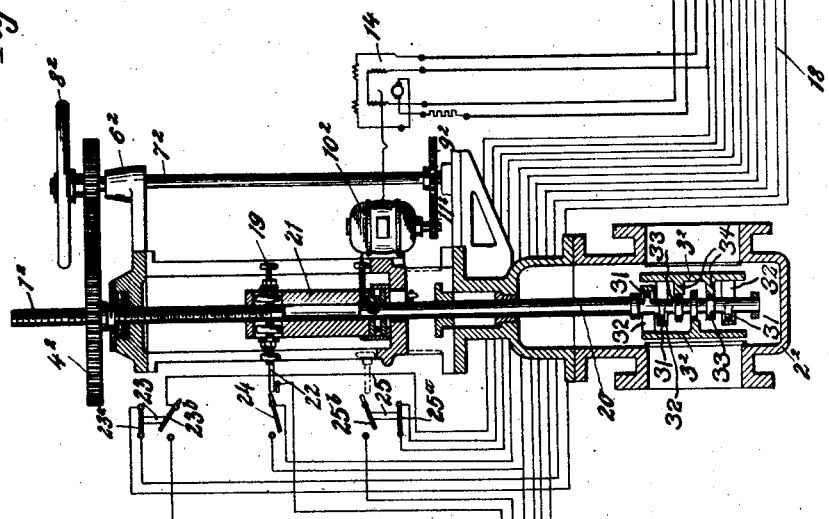

Patented Jan. 27, 1931

1,790,009

UNITED STATES PATENT OFFICE

KURT KARNATH, OF ZWEIBRUCKEN, GERMANY

STOP VALVE

Application filed October 18, 1928, Serial No. 313,227, and in Germany March 3, 1928.

The invention relates to stop-valves, and more particularly to stop-valves of the kind wherein valve or sluice plates are, for opening purposes, first moved away from their seats, substantially parallel with themselves, and are then moved transversely of the initial movement, to take them out of the path of the fluid.

In the following I shall describe valve mechanism of the kind wherein two parallel valve plates control ports facing each other and are moved as described by means of a composite spindle having two parts, both capable of axial movement, with a coupling between them whereby one of them is, by simultaneous rotation and axial movement of the other, caused to rotate without axial movement during part of the operation, and is moved axially without rotation during another part of the operation. The rotation of this part of the spindle serves to move the valve plates to and from their seats, parallel with themselves, and the axial movement moves them into or out of the path of the fluid.

The object of my invention is to provide improved means for controlling the valve, and to this end I provide electric controlling means including an electromotor connected by gearing to a valve actuating spindle which can also be actuated by hand, so that in case of failure of the motor the valve can be manually actuated without requiring any change or adjustment of the gear to enable this to be done.

With the actuating mechanism of the stop-valves hitherto known, this desirable arrangement of the separate operating means was not possible, as each high-pressure valve required a pressure equalizing device for relieving the valve plates of one-sided pressure, and this equalizing device had to be separately controlled. The driving motors hitherto used with stop valves having no such pressure equalizing devices had to be of substantial size, owing to the high pressure to be overcome for removing the plates from their seatings. The armature of the motor can in such circumstances not be rotated by hand, and for manual operation it was necessary to disconnect the motor from the mechanism controlling the valve plates prior to operation of the stop-cock by hand.

A further feature of the invention relates to the construction of the actuating mechanism, which in the initial stage of the opening operation holds the valve plates in a partly open position, and subsequently moves them to the completely open position, when the cold pipe to which the fluid is to be supplied, has become heated. In this way, abrupt movement of the valve plates from their closed position into the position in which they are open for full flow, is avoided. While the valve plates are in the partly open position, only so much of the working fluid, for example steam or the like, at high temperature and pressure is admitted into the pipe connected to the valve, for the purpose of the heating referred to. The disadvantages hitherto connected with rapid heating of these pipes are thus avoided.

In the accompanying drawings Figs. 1, 2, and 3 are elevations of three embodiments of the improved valve mechanism.

Fig. 4 is a vertical section of the valve shown in Fig. 3, showing also diagrammatically the electric control devices, Fig. 5 shows a portion of the circuit diagram to a larger scale, and Fig. 6 is a detail elevation of the stop-valve shown in Fig. 4.

Referring first to the construction shown in Fig. 1, a spindle 1, screw-threaded at the top, projects from the top of a casing 2, in which casing there are two valve or sluice plates 3 facing ports at opposite sides of the casing and controlled by means of the spindle, as will be described hereinafter. On the spindle, outside the casing, there is a gear wheel 4, which is internally screw-threaded for threaded engagement with the spindle, and which itself engages a toothed wheel 5. The casing has external brackets 6 constituting bearings for a vertical spindle 7, to which are fixed the wheel 5, a hand wheel 8, and a bevel wheel 9 at the lower end of the spindle. An electromotor 10 drives a bevel wheel 11 meshing with the bevel wheel 9, the wheel 11 being on a shaft connected to the motor shaft by gears 12. The spindle 7 may be of any convenient length, so that the hand wheel 8 and the electromotor may if desired be in a room below that which contains the valve itself.

In the modification shown in Fig. 2 there are a spindle $1^1$, casing $2^1$, valve plates $3^1$, gears $4^1$, $5^1$, spindle $7^1$ and hand wheel $8^1$, all precisely similar to corresponding parts described with reference to Fig. 1, but on the spindle $7^1$ there is a gear wheel $9^1$ driven by means of a pinion $11^1$ and an electromotor $10^1$ connected by a bracket to the upward, tubular extension of the casing $2^1$.

In the modification shown in Fig. 3 there are a spindle $1^2$, casing $2^2$, valve plates $3^2$, gears $4^2$, $5^2$, spindle $7^2$, motor $10^2$ and gears $9^2$, $11^2$ for driving the spindle $7^2$, arranged in the same way as the corresponding parts in Fig. 2, but on the spindle $7^2$ there is a hand wheel $8^2$ at the upper end, above the gear wheel $5^2$.

It will be understood, from these illustrated examples, that the actuating mechanism can be arranged in a variety of ways, as may be most convenient to the conditions under which the apparatus is to be used.

Fig. 4 shows an apparatus in which the arrangement of the actuating mechanism is similar to that shown in Fig. 3. The electromotor $10^2$ is driven by direct current taken from mains 12; a switch connects these mains to a relay 13 of known type connected to the motor coils 14, which are shown diagrammatically in the figure, separate from the body of the motor. The relay is controlled by a switch board 15 having a two-way switch 16 and a switch 17.

The switch 16, in conjunction with the relay 13, serves for closing the circuit of the electromotor $10^2$, for starting the opening and closing movements of the valve, the switch being adapted alternatively to close one or the other of two contacts connected by wires 18 to the relay 13, so that the motor will rotate in one or the other direction.

By means of the switch 17 the motor circuit can be opened at any time, so that the valve plates can be stopped in any position to which they have been moved by the motor.

From the spindle $1^2$ project short arms 19, working in vertical slots $19^a$ in the casing 2, said spindle being coupled with a spindle 20 by means of a sleeve 21. The arms 19 extend through helical slots in the sleeve 21. Rotation of the latter is prevented by an arm $21^a$ extending into one of the vertical slots $19^a$, except in the position shown in Fig. 4, where the sleeve rests on an abutment in the casing 2 and the said vertical slot communicates with a horizontal slot $19^b$ into which the arm $21^a$ can move. Depression of the spindle $1^2$ then causes the sleeve to be rotated by the arms 19 working in the helical slots in the sleeve, and the spindle 20, which is fixed to the sleeve, is then also rotated. One of the arms 19 has an extension 22, projecting from the casing, and in the path of this extension there are three switches 23, 24, 25, the switches 23 and 25 being respectively at the ends of this path, and the switch 24 being in the position which the actuating member 22 occupies when the valve plates have been withdrawn from their seats but have not been lifted to afford a clear passage to the fluid.

The switches 23 and 25 are double switches, having switch levers $23a$, $23b$ and $25a$, $25b$ respectively. The switch levers $23a$ and $25a$ control separate circuits connected to the relay 13, and by opening these circuits they cause the relay to open the motor circuit. The switch 24 also controls a circuit connected to the relay, and by opening this circuit causes the relay to open the motor circuit.

The switch arms $23b$ and $25b$ respectively control the circuits of pilot lamps 26 and 27 on the switch board. The lamp 26, controlled by the switch arm $23b$, is lighted, to indicate that the valve is open, when the member 22 reaches the upper end of its path, and the lamp 27, indicating that the valve is closed, is lighted when the member 22 reaches the bottom of its path.

In the position shown in Fig. 4 the member 22, which is of electrically conductive material, is not only holding the switch 24 open, but is bridging the gap between two electric contacts 28, $28a$, thus closing the circuit of a pilot lamp 29, which indicates that the valve is in the intermediate position hereinbefore referred to.

The switch lever 24 is so constructed, that it is only actuated by the member 22 in the course of the upward movement of that member. In the course of the downward movement it remains in the position shown in Fig. 5, so that during the closing of the valve there is no interruption of the motor circuit by the relay 13, and the movement of the valve plates is not stopped in the intermediate position.

The circuits of the pilot lamps 26, 27, 29 are controlled also by a manual switch 30, enabling the lamps to be extinguished when they are not required, as for example when the valve is to be left for a considerable time in the open, closed or intermediate position.

In the course of manual actuation of the valve by means of the hand wheel $8^2$ the motor armature is caused to rotate idly, by reason of its connection with the spindle $7^2$.

Assuming the valve to be closed when the rotation of the hand wheel starts, the valve plates 3 are first withdrawn from their seats at the rims of the ports, into the position shown in Fig. 4. This withdrawal of the plates is effected by means of cams 31 on the spindle 20 working in U-shaped members 32 projecting from the plates. A small passage for the fluid is thus opened, and if the fluid is hot, being for example steam at high pressure, it is enabled to heat up the conduit to which it is admitted, before the full flow starts. By continued rotation of the hand wheel the spindle 20 is lifted without rotation, and lifts the valve plates out of the path of the fluid. By opposite rotation of the hand-wheel the spindles $1^2$ and 20 are first lowered, without rotation of the spindle 20, the latter being then rotated so that cams 33 thereon, acting on lugs 34 on the plates, push the plates back to their seats.

For opening and closing the valve by means of the electromotor $10^2$ the method is as follows.

The valve being closed, the member 22 is in a position indicated by broken lines in Fig. 4, at the bottom of its path. The switch lever 25b is then in position in which it closes the circuit of the pilot lamp 27, and the switch lever 25a is in the position in which the circuit which it controls is open.

For opening the valve one arm of the switch 16 is pressed, causing the relay 13 to be actuated so that the electromotor $10^2$ is started. The spindles $1^2$ and 20 are consequently rotated, and withdraw the valve plates from their seats. When these valve plates reach the intermediate position, approximately as shown in Fig. 4, the actuating member 22 reaches the switch 24, which it opens, causing the relay 13 to stop the motor. The valve plates are then, as previously described in a position allowing of a slight or moderate flow of steam or other fluid. The member 22 in this position bridges the contacts 28, 28a, so that the pilot lamp 29 is lighted. If the valve is to be left in this position for some time the circuit of the pilot lamp may be opened by means of the switch 30.

For completing the opening of the valve the switch 16 is again actuated by hand, causing the relay 13 to start the motor again, whereby the valve plates are lifted out of the path of the fluid. The member 22 is moved to the upper end of its path and then rocks the switch lever 23b into the closed position shown in Fig. 5, at the same time pulling the lever 23a into its open position. By this means the motor is stopped and the pilot lamp 26 is lighted.

For closing the valve the second arm of the switch 16 is actuated, causing the relay 13 to start the motor $10^2$, so that it rotates in the opposite direction to that in which it previously worked. The valve plates are accordingly moved downwards and then pushed against their seats, without any interruption such as was produced by the switch 24 in the course of the opening movement. When the member 22 reaches the switch 25, the valve being then closed, the switch lever 25a is moved into its open position, causing the motor to be stopped, and the switch lever 25b closes the circuit of the pilot lamp 27.

As already mentioned the motor can be stopped at any time by means of the switch 17, the valve plates then remaining stationary in whatever position they have reached.

The automatic stopping of the motor, as described, when the valve has reached certain positions, enables the electrical control to be effected without risk of accident due to careless or unskilled handling. The switch 24 prevents such sudden, complete opening of the valve as might cause accident or damage due to premature admission of the full stream of fluid to conduit or apparatus into which the fluid is to flow.

The electromotor may be of comparatively small power, especially if the valve plates are elastic. Whereas with valves of the kind in which there are no means for balancing the fluid pressure the fall pressure must be overcome in order to open the same, a valve of the construction herein shown can be constructed with elastic valve or sluice plates so arranged that for opening purposes small portions of the plates are bent away from their seats, at the rims, which can be done with very little power and then enables the opening to be completed without comparatively long waiting till there has been adequate equalization of pressure between the supply and delivery sides of the valve.

A small motor, such as is required for actuating the valve electrically, causes no difficulty when actuating the valve manually, though its armature is coupled with the mechanism used for manual actuation.

What I claim as my invention and desire to secure by Letters Patent of the United States is:—

1. The combination of a valve including a valve seat surrounding a port, a valve, and valve gear for moving said valve to and from said seat in the direction of the axis of the port, and also transversely of said axis to expose the port pulley after withdrawal of said valve from said seat, the combination of an electromotor for operating said valve gear, electrical connections leading to said motor, switches in said connections, a member carried by said valve gear for automatically throwing said switches at the ends of the opening and closing movements of said valve respectively to stop said motor; and an intermediate switch adapted to be engaged by said member in the opening movements of said valve to stop said motor when said valve occupies a partly open position.

2. In a valve as claimed in claim 1, a manually controlled switch for re-starting the motor to complete the opening of said valve.

3. In a valve as claimed in claim 1, the combination of a plurality of pilot lamps, and switch mechanism controlling said lamps adapted to be actuated by said member, whereby one of said lamps is lighted on the completion of the opening of the valve and extinguished when the closing starts, another of said lamps is lighted on completion of the closing and extinguished when the opening starts, a third lamp is lighted to indicate the partly open position of said valve, and a single manually operated switch for controlling all of said lamps independently of said switch mechanism.

4. In a stop-valve mechanism, the combination of a valve seat, a valve, valve gear for moving said valve to and from its seat, an electromotor for operating said valve gear, electric circuit connections leading to said motor, switches in said connections, means connected with said valve gear whereby said switches are operated at the ends of the opening and closing movements of said valve to break said connections and stop said motor, and an additional switch located in said connections and operated by said means to break the connections and stop said motor when said valve has reached a partly open position.

5. In a stop-valve mechanism, the combination of a valve seat, a valve, valve gear for moving said valve to and from its seat, an electromotor for operating said valve gear, electric circuit connections leading to said motor, switches in said connections, means connected with said valve gear whereby said switches are operated at the ends of the opening and closing movements of said valve to break said connections and stop said motor, and an additional switch located in said connections and operated by said means during the opening movement of said valve to break the connections and stop said motor when said valve has reached a partly open position, said additional switch being undisturbed by said means during the return movement of said valve to its seat.

In testimony whereof, I have signed this specification.

KURT KARNATH.